Patented Oct. 21, 1952

2,614,957

UNITED STATES PATENT OFFICE 2,614,957

SODIUM DIMETHYL DITHIOCARBAMATE AND SODIUM SALT OF 2-MERCAPTO-BENZOTHIAZOLE SYNERGISTIC FUNGICIDAL COMPOSITION

Albert A. Somerville, Carmel, N. Y., assignor to R. T. Vanderbilt Company, Inc., New York, N. Y., a corporation of New York No Drawing. Application October 25, 1951, Serial No. 253,215

2 Claims. (Cl. 167—22)

This invention relates to compositions of matter which are useful as agricultural and industrial fungicides.

It is known in the art that sodium dimethyl dithiocarbamate possesses useful fungicidal properties, and it is the object of the present invention to provide new compositions of matter having improved fungicidal properties and containing sodium dimethyl dithiocarbamate and the sodium salt of 2-mercaptobenzothiazole, a compound of the formula:

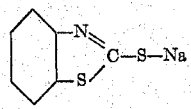

The new compositions possess enhanced utility in that they possess fungicidal properties greater than those which would be expected from the fungicidal properties of the constituents of such compositions.

The aforementioned object is accomplished in accordance with the present invention by providing a composition having utility as a fungicide and containing as active ingredients about 75 to 99% by weight of sodium dimethyl dithiocarbamate and about 25 to 1% by weight of the sodium salt of 2-mercaptobenzothiazole, based upon the weight of the two aforementioned sodium compounds.

Various standard and approved methods were used in comparing the fungicidal effectiveness of the mixtures of the present invention with the effectiveness of the separate active ingredients thereof. One method which has been found to be easily reproduced, which gives relatively constant results without involving cumbersome techniques, and which has been applied to a number of fungi is given in detail below.

This method consists of a test tube dilution, using a nutrient salt solution (composed of 40 grams of dextrose, 2 grams of asparagine, 0.5 gram of potassium dihydrogen phosphate, 0.25 gram of $MgSO_4.7H_2O$, 0.0003 gram of thiamine chloride and 1,000 ml. of distilled water), a spore suspension, for example, of Aspergillus niger (made from mature, healthy culture tubes by washing a given tube with four aliquots of 5 ml. of distilled water and thereafter diluting the washings with distilled water to a total of 200 ml.) and a solution of the protectant (fungicide).

The dilution test was performed by first adding to a test tube 1 ml. of the nutrient solution, after which 3.50 ml. of the spore suspension was added and the mixture was agitated. The protectant was solubilized in a minimum amount of water. In testing the effectiveness of various protectants, varying amounts thereof were added to a given test tube containing the 1 ml. of nutrient solution and the 3.50 ml. of the spore suspension, the final volume of the mixture of nutrient solution, spore suspension and protectant solution in a given test tube being 5 ml. The test tube containing the 5 ml. total mixture was then agitated to attain homogeneity, and by means of a 1 ml. pipette (graduated in 1/100 ml. subdivisions) drops of the mixture were placed on chemically cleaned microscope slides in triplicate.

These slides were placed in large Petri dishes (150 mm. x 20 mm.) containing a quantity of distilled water and a glass rod support which held the slides above the surface of the water. Petri dish covers were placed on the dishes and the spores were then incubated for 48 hours at $30 \pm 1°$ C. The presence of the water in the Petri dishes assumed high humidity, thereby preventing the test solutions from drying. At the end of the incubation period, the slides were removed from the Petri dishes and were examined microscopically for signs of germination of the spores. Where no spores had germinated, the protectant at the concentration employed was considered to be completely fungicidal or fungistatic.

The following table contains data obtained using the method just described, the test organism being Asperigillus niger:

| Active Fungicidal Ingredients | | Minimum p. p. m. of active ingredients for zero germination in dilution test |
|---|---|---|
| Weight percent sodium dimethyl dithiocarbamate | Weight percent sodium salt of mercaptobenzothiazole | |
| 100 | 0 | 100 |
| 99 | 1 | 20 |
| 95 | 5 | 1 |
| 90 | 10 | 1 |
| 75 | 25 | 10 |
| 0 | 100 | 150 |

In order to demonstrate that the unexpectedly high activity of the present compositions is not specific to Aspergillus niger alone, various compositions falling within the scope of the present invention were tested upon the organisms Fusarium oxysporum var. cubense and upon the oak wilt pathogen, Chalara quercina, as well as upon the organisms which cause stem end rot in bananas. With respect to these organisms also, such compositions exhibited unexpected activity as fungicides. In addition, various compositions falling within the scope of the present invention have been shown to exhibit unexpected fungicidal activity with respect to the organisms which cause sap stain on freshly sawn lumber and also with respect to the organisms which cause the spoilage of cutting oils, and in the lumber and cutting oil fields the present invention has proved of definite value from a commercial standpoint.

While the synergistic effect on the activity of the sodium dimethyl dithiocarbamate may be clearly demonstrated by use of 1% by weight of the sodium salt of 2-mercaptobenzothiazole, the preferred commercial compositions contain a ratio of about 95 to 90% by weight of sodium dimethyl dithiocarbamate and about 5 to 10% by weight of the sodium salt of 2-mercaptobenzothiazole, based upon the weight of the sodium dimethyl dithiocarbamate and the sodium salt of 2-mercaptobenzothiazole. If desired, the compositions may contain a small amount of a substance to mask its odor, for example, 0.1% by weight of terpineol or pine oil.

The compositions of the present invention may conveniently be used in the form of a conventional agricultural fungicide spray, for example, admixed with water. Also, the composition may be used in the form of a dust prepared, for example, by first preparing an intimate mixture of the active ingredients and thereafter admixing such mixture with a conventional inert, solid diluent, such as lime, bentonite, talc, pyrophyllite, gypsum, chalk, silica, etc.

This application is a continuation-in-part of Serial No. 87,831, filed April 15, 1949, now abandoned.

I claim:

1. An agricultural and industrial fungicide containing as active fungicidal ingredients about 99 to 75% by weight of sodium dimethyl dithiocarbamate and about 1 to 25% by weight of the sodium salt of 2-mercaptobenzothiazole, the percentages being based upon the total weight of the two aforementioned sodium compounds.

2. An agricultural and industrial fungicide containing as active fungicidal ingredients about 95 to 90% by weight of sodium dimethyl dithiocarbamate and about 5 to 10% by weight of the sodium salt of 2-mercaptobenzothiazole, the percentages being based upon the total weight of the two aforementioned sodium compounds.

ALBERT A. SOMERVILLE.

REFERENCES CITED

The following references are of record in the file of this patent:

UNITED STATES PATENTS

| Number | Name | Date |
|---|---|---|
| 1,962,109 | Alvord | June 5, 1934 |
| 1,972,961 | Tisdale et al. | Sept. 11, 1934 |

OTHER REFERENCES

Goldsworthy et al., J. Agr. Res., volume 66, Number 7, pages 277 to 291, April 1, 1943.